United States Patent [19]
Alexander et al.

[11] 3,751,073
[45] Aug. 7, 1973

[54] METHOD AND APPARATUS FOR TOWING TRAILERS

[76] Inventors: William M. Alexander, 8554 Sonneville Dr.; Lawrence J. Stancik, 8562 Sonneville Dr., both of Houston, Tex. 77055

[22] Filed: Sept. 27, 1971

[21] Appl. No.: 183,901

[52] U.S. Cl............ 280/482, 280/34 A, 280/414 R, 214/152
[51] Int. Cl............................................ B62d 53/00
[58] Field of Search................... 280/482, 400, 402, 280/414 R, 34 A; 214/86 A

[56] References Cited
UNITED STATES PATENTS

| | | | |
|---|---|---|---|
| 1,374,224 | 4/1921 | Patterson | 214/86 A |
| 1,860,518 | 5/1932 | Wells | 280/402 |
| 2,135,857 | 11/1938 | Stahl | 214/506 |
| 2,661,108 | 12/1953 | Horn et al. | 280/414 X |
| 3,348,859 | 10/1967 | Melbye | 280/414 R X |
| 3,411,644 | 11/1968 | Cook | 280/482 UX |
| 3,649,064 | 3/1972 | Bledsoe | 280/414 R |

*Primary Examiner*—Leo Friaglia
*Attorney*—Michael P. Breston

[57] ABSTRACT

This invention relates to a piggyback extension for piggybacking a wheeled trailer. The extension includes a frame, a hitch disposed near the front end of the frame to connect the frame to a towing vehicle, and a hitch disposed near the rear end of the frame to connect the frame to a trailer. The extension when so connected is disposed in a generally-horizontal orientation. A support, laterally-mounted on the frame, is adapted to hold the axle of the trailer being piggybacked.

2 Claims, 4 Drawing Figures

PATENTED AUG 7 1973  3,751,073

INVENTORS.
WILLIAM M. ALEXANDER,
LAWRENCE J. STANCIK,
BY
MICHAEL P. BRESTON
ATTORNEY.

METHOD AND APPARATUS FOR TOWING TRAILERS

BACKGROUND OF THE INVENTION

Trailer extensions for use as coupling devices between a towing vehicle and a trailer are known. One such extension is shown in U.S. Pat. No. 3,411,644, FIGS. 13–16. The coupling device is a frame having a standard hitch connector at its apex and a standard ball hitch rising centrally from a transfer member that is located near the end of the frame. In use, the hitch connector of a trailer is attached to the ball hitch or the rear end of the coupling device, and the hitch connector of the extension is attached to the ball hitch on the towing vehicle.

Typically, the towing vehicle is a pickup truck used to tow a boat trailer. Said patent suggests that it is desirable to be able to carry one boat on the truck while carrying another boat on the towed boat trailer, or that it is desirable for a sportsman to pull a house trailer for living at a campsite and to haul a boat on the truck. This can be accomplished by attaching a short-tongued trailer to a boat-loaded truck with a V-formed extension. The extension allows space between the trailing end of the boat and the short trailer.

In sum, this patent suggests that when it is desired to tow a short-tongued trailer and a boat-loaded truck, the short-tongued trailer can be transformed by an extension into a long-tongued trailer.

U.S. Pat. No. 2,795,345 shows an extension for a boat trailer which permits the trailer tongue to become elevated without detaching the trailer from the towing vehicle for the purpose of changing the angle of the bed of the trailer to allow the boat to slide more easily off the rear end of the trailer.

U.S. Pat. No. 3,446,516 shows a tandem of two trailers, closely coupled together in end-to-end realtion. The tandem is designed to carry a house trailer and a boat trailer with both trailers having their wheels on the road.

For a tandem trailer, most states impose a lower speed limit as compared to a single towed trailer.

SUMMARY OF THE INVENTION

This invention relates to the art of moving two wheeled trailers by having the wheels of only one trailer ride on the ground and the other trailer being piggybacked on a trailer extension. The extension is detachably coupled between a tongued trailer and a hitch connector on the towing vehicle. The extension preferably has means for supporting the axle of the piggyback trailer. Accordingly, this invention relates to the transporting of a small trailer on an extension in a piggyback manner.

BRIEF DESCRIPITON OF THE DRAWINGS

Figure 3:
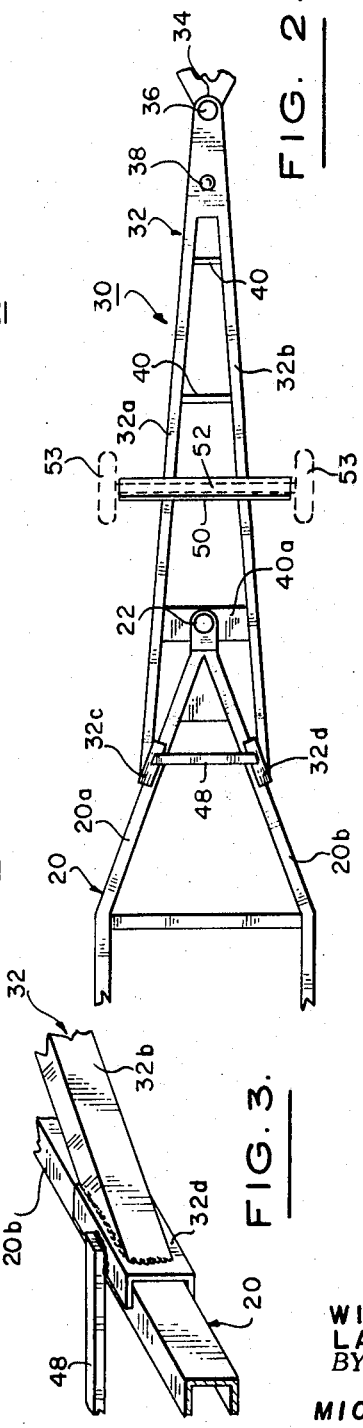
FIG. 3 is an enlarged view in perspective of the manner of attaching the trailer end of the extension to the tongue of the towed trailer.

Referring now more specifically to the drawings, there is shown a towing vehicle 10, which may be a passenger car, a pickup truck, or the like. To the rear end 12 of towing vehicle 10 is attached a ball hitch 14 of conventional design. A boat 16 is mounted on a boat trailer, generally designated as 18, having a short-tongue 20 provided at its apex with a hitch connector 22. The trailer tongue 20 includes tongue members 20a and 20b, each typically made of C-shaped channel steel, as shown in FIG. 3.

The piggyback extension of this invention is generally designated as 30 and includes a frame 32 having preferably a V-tongue configuration. On its apex 34 is a standard hitch connector 36, and longitudinally and inwardly displaced therefrom is a standard ball hitch 38. Frame 32 is provided with a plurality of longitudinally-displaced cross-bracing members 40. Rising centrally from a tansverse member 40a, positioned near the end of frame 32, is a ball hitch 42.

V-tongue frame 32 includes frame members 32a and 32b to the free ends of which are secured C-shaped clamps 32c and 32d, respectively. Each clamp has an inner sectional area slightly larger than the outer sectional area of a mating frame member 20a and 20b, as shown in FIG. 3. The clamps are rigidly maintained by a cross member 48 which may be welded to the clamps, as shown. The configuration of the tongue members can be varied to enable the piggyback extension 30 to fit a variety of types of trailer tongues.

Figure 4:
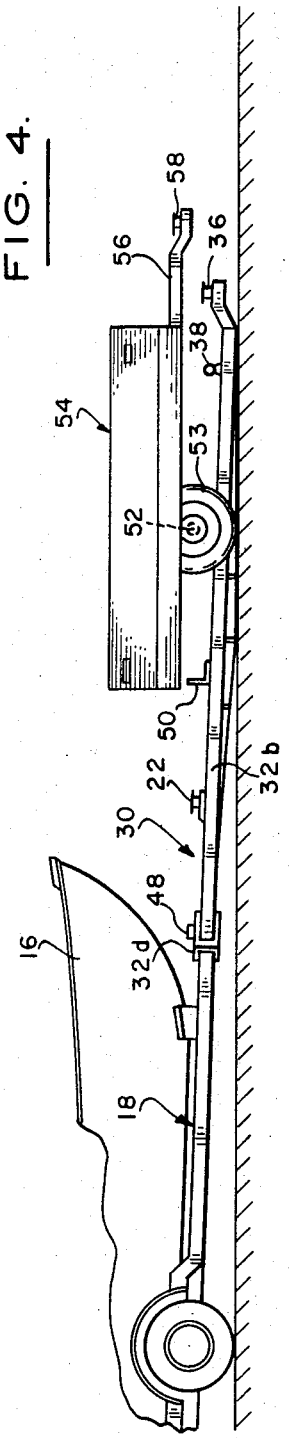
FIG. 4 is a side view illustrating the manner of loading and unloading the sportsman trailer on the piggyback extension.

Mounted on frame 32 and oppositedly extending therefrom is a suitable axle support or axle retainer 50 which securely retains the axle 52 of a small-tongued trailer, generally designated as 54. The axle support 50 may conveniently have an L section, as shown in FIG. 4.

In operation, to use the piggyback extension 30 of this invention, the hitch connector 22 of the short-tongue 20 of trailer 18 is first detachably secured to the ball hitch 42 on the cross member 40a. When this hitch connection is established, the clamps 32c and 32d will be in tight engagement with the frame members 20a, 20b, respectively.

The wheels 53 of the small or sportsman trailer 54 are then rolled backwards until axle 52 is retained by the support 50. The short-tongue 56 of trailer 54 also has at its apex a hitch connector 58. A mating ball hitch 38 near the apex of the extension 30 will then be positioned immediately underneath hitch connector 58. A detachable coupling is then established between 58 and 38.

Figure 1:
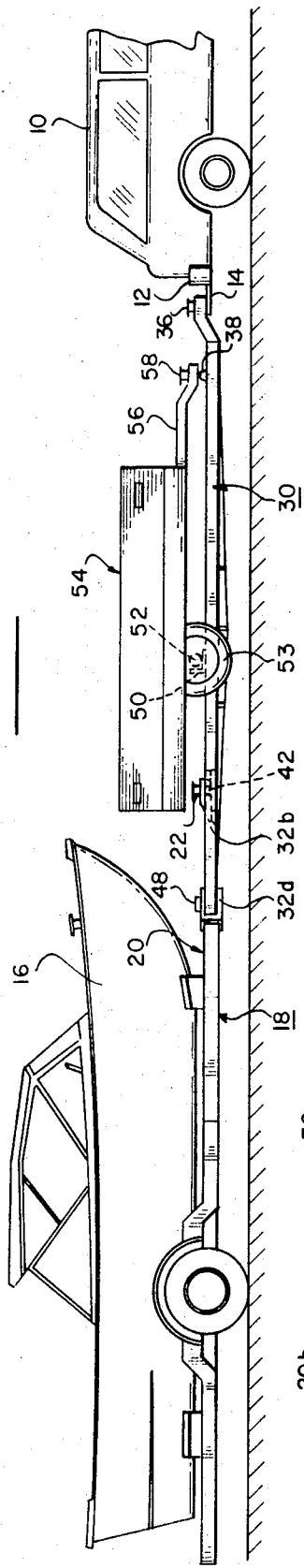
FIG. 1 shows a side view in elevation of an extension, detachably secured between a towing vehicle and a towed boat trailer, for piggybacking a sportsman trailer.
Figure 2:
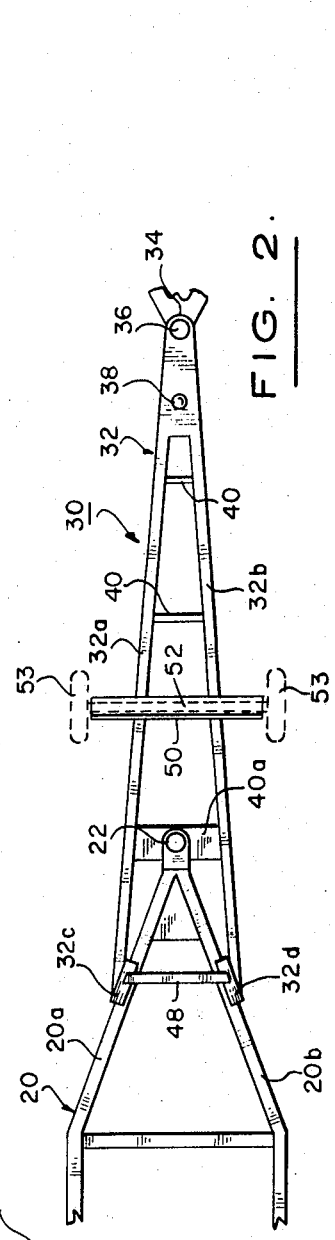
FIG. 2 is a plan view of the piggyback extension.

Thereafter, frame 32 is lifted thereby lifting the trailer 54 thereon and the hitch connector 36 is detachably secured to the ball hitch 14 on the rear end 12 of the towing vehicle 10. As best seen in FIG. 1, the small trailer 54 receives a piggyback ride on the extension 30. The wheels 53 of trailer 54 are not in physical contact with the road 62.

Accordingly, the boat trailer 18 together with the piggyback extension 30 form a tandem combination without allowing relative rotation between trailer 18 and extension 30. The tandem has only two wheels and hence the speed limit thereof need not be reduced, in most states, as above mentioned.

While this invention has been described with particular reference to specific apparatus, variations are possible without departing from the scope of the claims attached hereto.

What is claimed is:

1. A wheel-free trailer extension for piggybacking a trailer mounted on wheels, said extension being adapted for coupling between a towed trailer and a towing vehicle with said extension serving as an extension of said towed trailer, said towed trailer having a tongue whose tongue members are provided at their apex with first hitch connector means, and said towing vehicle having second hitch connector means at the rear end thereof, said trailer extension comprising:

a tongue-shaped frame whose tongue members are adapted to engage the tongue members of the towed trailer to prevent relative rotation between said frame and the tongue of the towed trailer;

third hitch connector means on the apex of said frame for detachably coupling said extension to the second hitch connector means;

fourth hitch connector means on said frame between the apex and the base of said frame for detachably coupling with said first hitch connector means; and fifth hitch connector means on said frame, between said third and fourth hitch connector means, for detachably coupling with the hitch connector means of the piggybacked trailer.

2. The trailer extension of claim 1, and a support laterally mounted on said frame for detachably receiving the axle of the piggybacked trailer.

* * * * *